US012687072B1

(12) United States Patent

Richards et al.

(10) Patent No.: US 12,687,072 B1

(45) Date of Patent: Jul. 21, 2026

(54) SYSTEMS AND METHODS FOR TRANSMITTING TORQUE

(71) Applicant: Schlumberger Technology Corporation, Sugar Land, TX (US)

(72) Inventors: Edward Richards, Stonehouse (GB); Thomas Fox, Wallingford (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/076,569

(22) Filed: Mar. 11, 2025

(51) Int. Cl.
  *E21B 4/00* (2006.01)
  *F16H 13/08* (2006.01)

(52) U.S. Cl.
  CPC ............. *E21B 4/006* (2013.01); *F16H 13/08* (2013.01)

(58) Field of Classification Search
  CPC .... E21B 4/006; F16H 13/08; F16H 2025/063; F16H 13/04
  See application file for complete search history.

(56) References Cited

U.S. PATENT DOCUMENTS 2,764,030 A * 9/1956 Mackta ................... F16H 25/06
                                             74/216.3
5,016,487 A * 5/1991 Bollmann ............... F16H 25/06
                                             74/216.3

FOREIGN PATENT DOCUMENTS

GB          191103349 A * 2/1912 ............. F16H 25/06

* cited by examiner

*Primary Examiner* — Terence Boes
(74) *Attorney, Agent, or Firm* — Jeffrey D. Frantz

(57) ABSTRACT

A device may include an inner shell including an inner groove having an inner groove angle relative to the rotational axis. A device may include an intermediate shell circumferentially around the inner shell and having a slot therein, the slot being at least partially oriented in a longitudinal direction of the rotational axis. A device may include an outer shell circumferentially around the intermediate shell and including an outer groove having an outer groove angle relative to the rotational axis different from inner groove angle. A device may include a bearing positioned in the slot and contacting the inner groove and the outer groove.

19 Claims, 8 Drawing Sheets

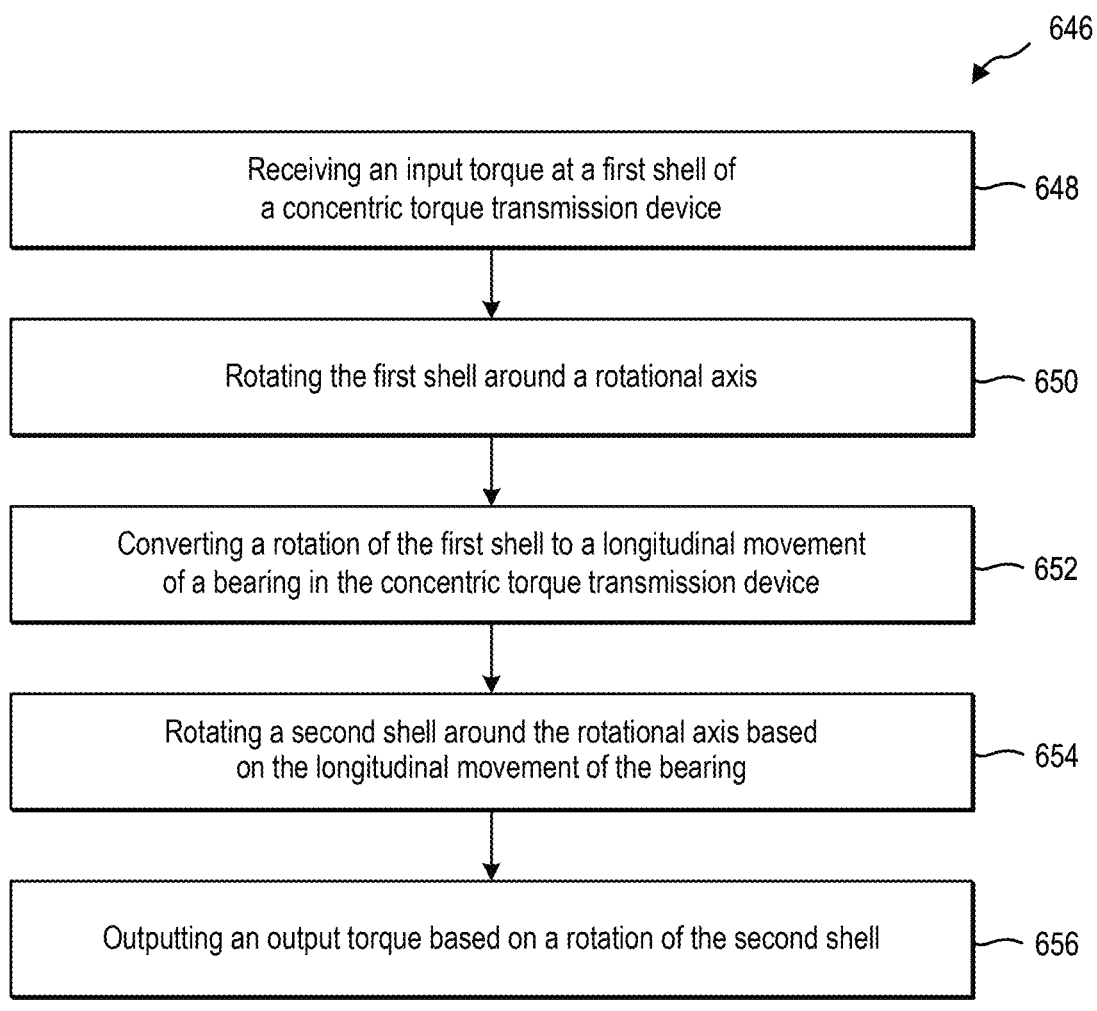

646

| |
|---|
| Receiving an input torque at a first shell of a concentric torque transmission device | ~ 648 |

↓

| Rotating the first shell around a rotational axis | ~ 650 |

↓

| Converting a rotation of the first shell to a longitudinal movement of a bearing in the concentric torque transmission device | ~ 652 |

↓

| Rotating a second shell around the rotational axis based on the longitudinal movement of the bearing | ~ 654 |

↓

| Outputting an output torque based on a rotation of the second shell | ~ 656 |

FIG. 6

SYSTEMS AND METHODS FOR TRANSMITTING TORQUE

BACKGROUND

For drilling of a borehole, directional drilling allows creation of a non-linear borehole or a linear borehole through varying earth formations. A drill bit breaks and clears formation material by rotation of the drill bit relative to the formation. In some instances, it is beneficial to have a download torque and/or rotational speed of the drill bit that is different from an input torque and/or rotational speed at a surface drive. Conventional axial transmissions include one or more gears, such as planetary gears, to convert torque around a rotational axis. Such gears can limit a minimum diameter of the drill string, however.

SUMMARY

In some aspects, the techniques described herein relate to a device for transmitting torque around a rotational axis, the device including: an inner shell including an inner groove having an inner groove angle relative to the rotational axis; an intermediate shell circumferentially around the inner shell and having a slot therein, the slot being at least partially oriented in a longitudinal direction of the rotational axis; an outer shell circumferentially around the intermediate shell and including an outer groove having an outer groove angle relative to the rotational axis different from inner groove angle, wherein a gear ratio of the device is based on the inner groove angle and outer groove angle; and a bearing positioned in the slot and contacting the inner groove and the outer groove.

In some aspects, the techniques described herein relate to a system for providing torque to a drill bit, the system including: a torque input element configured to provide an input torque around a rotational axis; a drill bit configured to receive an output torque around the rotational axis; and a torque transmission device including: a first shell including a first groove having a first groove angle relative to the rotational axis, the first shell being rotationally fixed relative to the torque input element and configured to receive the input torque; a second shell circumferentially concentric with the first shell and including an second groove having an second groove angle relative to the rotational axis different from the first groove angle, the second shell being rotationally fixed relative to the drill bit and configured to provide the output torque; an intermediate shell circumferentially between the first shell and the second shell and having a slot therein, the slot being at least partially oriented in a longitudinal direction of the rotational axis; and a bearing positioned in the slot and contacting the first groove and the second groove.

In some aspects, the techniques described herein relate to a method of transmitting torque in a downhole environment, the method including: receiving an input torque at a first shell of a concentric torque transmission device; rotating the first shell around a rotational axis; converting a rotation of the first shell to a longitudinal movement of a bearing in the concentric torque transmission device; rotating a second shell around the rotational axis based on the longitudinal movement of the bearing; and outputting an output torque based on a rotation of the second shell.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which:

FIG. 3-1 is an axially exploded perspective view of a concentric torque transmission device, according to at least some embodiments of the present disclosure.

FIG. 3-2 is a detail perspective view of the inner shell and intermediate shell with bearings of the concentric torque transmission device of FIG. 3-1.

FIG. 3-3 is detail perspective view of the outer shell of the concentric torque transmission device of FIG. 3-1.

FIG. 5 is an axially exploded side view comparing the inner groove and the outer groove of a concentric torque transmission device, according to at least some embodiments of the present disclosure.

FIG. 6 is a flowchart illustrating a method of transmitting torque, according to at least some embodiments of the present disclosure.

DETAILED DESCRIPTION

Embodiments of the present disclosure generally relate to devices, systems, and methods for converting torque in a downhole environment. More particularly, devices, systems, and methods according to the present disclosure may allow a radially thinner torque conversion device compared to a conventional gearbox. In some examples, devices, systems, and methods according to the present disclosure allows for a greater variety of gearing ratios compared to a conventional gearbox.

A concentric torque transmission device, in some embodiments according to the present disclosure, includes a plurality of concentric shells configured to rotate relative to one another. In some embodiments, a bearing is located in a slot through an intermediate shell. The bearing contacts and is captured between a inner groove in a surface of the inner shell and an outer groove in the surface of the outer shell. Application of an input torque to any shell relative to another shell produces an output torque at the remaining third shell. For example, the intermediate shell may be held rotationally fixed while a torque is applied to the inner shell, and an output torque is output at the outer shell. The relative orientation of the inner groove and the outer groove to one another and to the rotational direction of the concentric torque transmission device around a rotational axis determines a gear ratio of the concentric torque transmission device. In some embodiments, the relative orientation of the inner groove and the outer groove allow selection of a direction of the output torque. In some embodiments, the concentric torque transmission device further includes a return channel that recirculates the bearing(s) from a first longitudinal end of the concentric torque transmission device to a second longitudinal end of the concentric torque transmission device, allowing a substantially continuous operation of the concentric torque transmission device.

Figure 1:
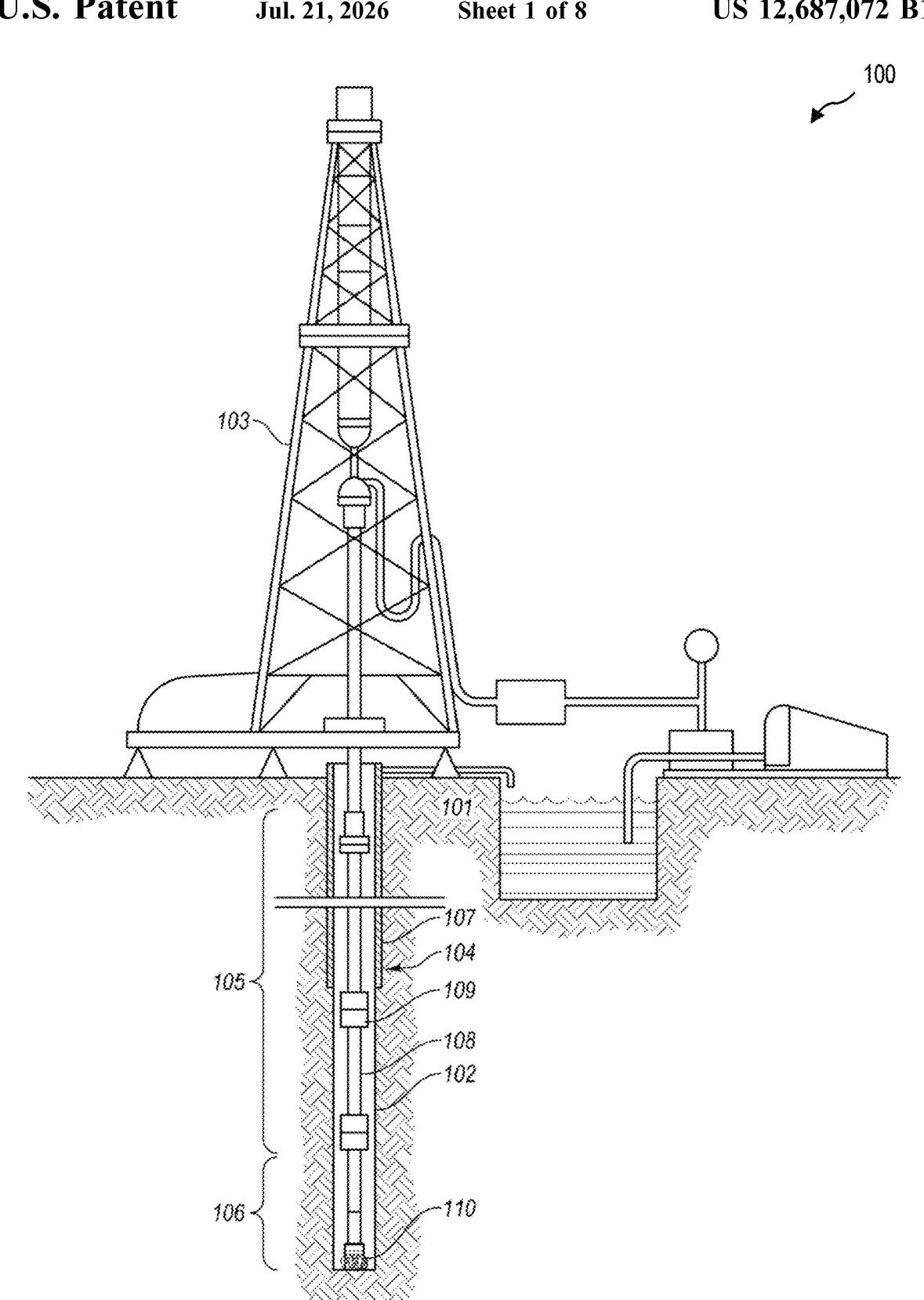
FIG. 1 illustrates a drilling system and downhole environment, according to some embodiments of the present disclosure.

FIG. 1 illustrates an embodiment of a drilling system and downhole environment. FIG. 1 shows one example of a drilling system 100 for drilling an earth formation 101 to form a borehole 102. The drilling system 100 includes a drill rig 103 used to turn a drilling assembly 104 which extends downward into the borehole 102. The drilling assembly 104 may include a drill string 105 and a bottomhole assembly (BHA) 106 attached to the downhole end of the drill string 105. Where the drilling system 100 is used for drilling formation, a drill bit 110 can be included at the downhole end of the BHA 106.

The drill string 105 may include several joints of drill pipe 108 connected end-to-end through tool joints 109. The drill string 105 transmits drilling fluid through a central bore and can transmit rotational power from the drill rig 103 to the BHA 106. In some embodiments, the drill string 105 may further include additional components such as subs, pup joints, etc. The drill pipe 108 provides a hydraulic passage through which drilling fluid 111 is pumped from the surface. The drilling fluid 111 discharges through selected-size nozzles, jets, or other orifices in the bit 110 for the purposes of cooling the bit 110 and cutting structures thereon, for lifting cuttings out of the borehole 102 as it is being drilled, and for preventing the collapse of the borehole 102. The drilling fluid 111 carries drill solids including drill fines, drill cuttings, and other swarf from the borehole 102 to the surface based on a hydrostatic pressure of the borehole 102. The drill solids can include components from the earth formation 101, the drilling assembly 104 itself, from other man-made components (e.g., plugs, lost tools/components, etc.), or combinations thereof.

The BHA 106 may include the bit 110 or other components. An example BHA 106 may include additional or other components (e.g., coupled between to the drill string 105 and/or the bit 110). Examples of additional BHA components include drill collars, stabilizers, measurement-while-drilling (MWD) tools, logging-while-drilling (LWD) tools, downhole motors, underreamers, directional steering tools, section mills, hydraulic disconnects, jars, vibration dampening tools, other components, or combinations of the foregoing.

In general, the drilling system 100 may include other drilling components and accessories, such as special valves (e.g., kelly cocks, blowout preventers, safety valves, centrifuges, shaker tables, and rheometers). Additional components included in the drilling system 100 may be considered a part of the surface system (e.g., drill rig 103, drilling assembly 104, drill string 105, or a part of the BHA 106, depending on their locations and/or use in the drilling system 100).

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits, roller cone bits, impregnated bits, or coring bits. In other embodiments, the bit 110 may be a mill used for removing metal, composite, elastomer, other materials downhole, or combinations thereof. For instance, the bit 110 may be used with a whipstock to mill into casing 107 lining the borehole 102. The bit 110 may also be a junk mill used to mill away tools, plugs, cement, other materials within the borehole 102, or combinations thereof. Swarf or other cuttings formed by use of a mill may be lifted to surface by the drilling fluid 111 or may be allowed to fall downhole. The conditions of the equipment of the drilling system 100, the formation 101, the borehole 102, the drilling fluid 111, or other part of the wellsite can change during operations.

In some embodiments, the BHA 106 and/or the drill string 105 includes one or more concentric torque transmission devices that receive an input torque from the uphole direction and convert the input torque to an output torque before transmitting the output torque in a downhole direction. For example, a concentric torque transmission device may receive an input torque from (e.g., be rotationally fixed relative to) the drill pipe 108 at the BHA 106 and convert the input torque to an output torque before transmitting the output torque to (e.g., be rotationally fixed relative to) the drill bit 110. In some embodiments, converting the input torque to the output torque changes a magnitude of the torque across the concentric torque transmission device, changes a magnitude of an angular velocity across the concentric torque transmission device, changes a direction of the torque across the concentric torque transmission device, changes a direction of the angular velocity across the concentric torque transmission device, or combinations thereof.

Figure 2:
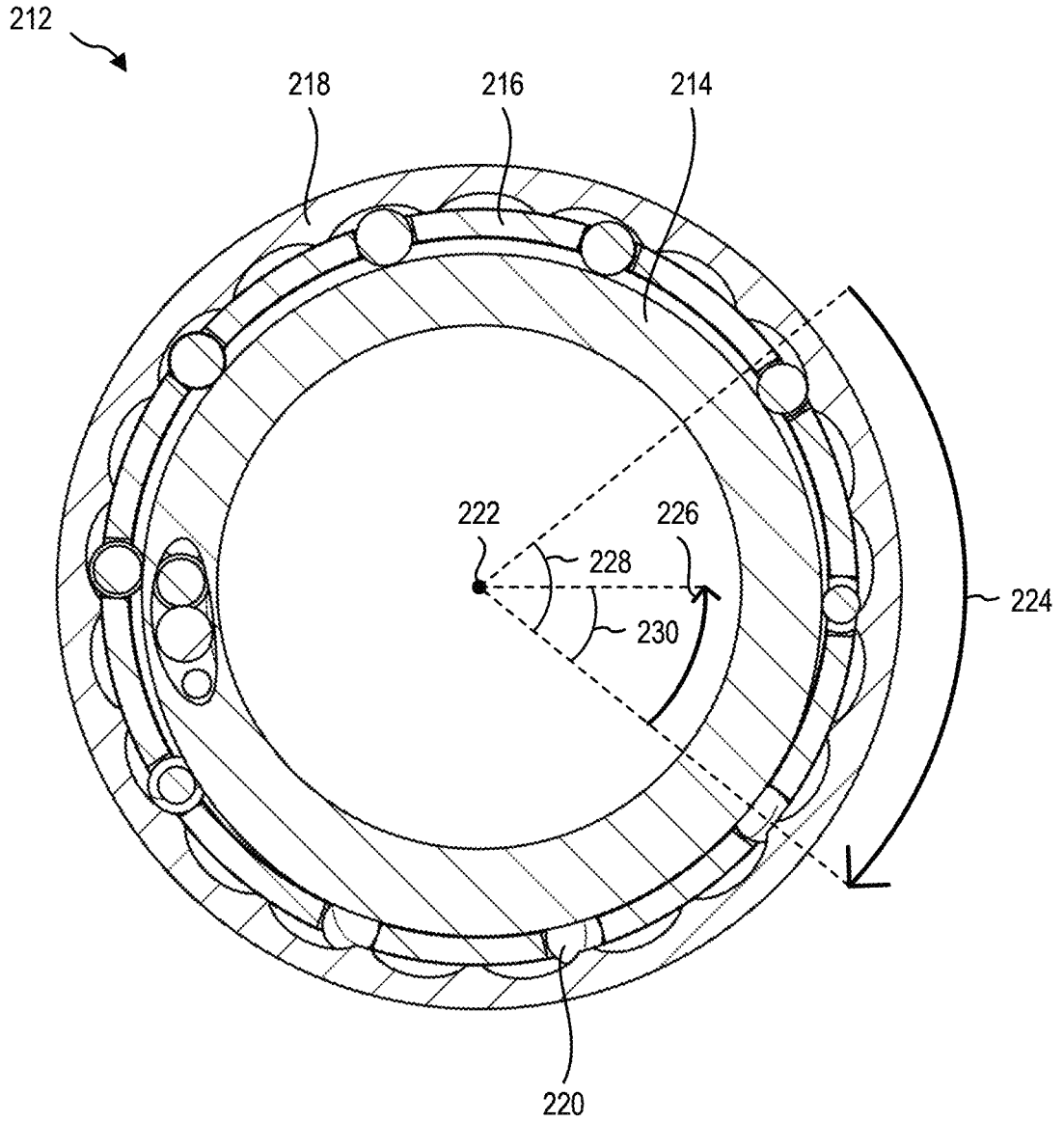
FIG. 2 is a transverse cross-sectional view of a concentric torque transmission device, according to at least some embodiments of the present disclosure.

FIG. 2 is a transverse cross-sectional view of a concentric torque transmission device 212. In some embodiments, the concentric torque transmission device 212 includes three concentrically arranged shells with one or more bearings therebetween and configured to transfer torque between the shells. In some embodiments, the concentric torque transmission device 212 includes an inner shell 214 that is radially closest to the rotational axis 222 of the concentric torque transmission device 212. In some embodiments, such as the system described in relation to FIG. 1, the rotational axis 222 of the concentric torque transmission device 212 is coaxial with a rotational axis of the drill string, BHA, drill bit, etc. (such as the drill string 105, BHA 106, drill bit 110, etc. of FIG. 1).

The concentric torque transmission device 212, in some embodiments, includes an intermediate shell 216 positioned circumferentially around and concentrically with the inner shell 214. The concentric torque transmission device 212 includes an outer shell 218 positioned circumferentially around and concentrically with the intermediate shell 216 and the inner shell 214. In some embodiments, the concentric torque transmission device 212 includes a bearing 220 located in the intermediate shell 216 and contacting the inner shell 214 and outer shell 218. The bearing 220 is, in some embodiments, contacting angled grooves in the outer surface of the inner shell 214 and the inner surface of the outer shell 218 such that the bearing is moved by the rotation of either the inner shell 214 and/or the outer shell 218 relative to one another or the intermediate shell 216. In some embodiments, the concentric torque transmission device 212 includes a plurality of bearings 220. For example, the plurality of bearings 220 may distribute lateral forces around the concentric torque transmission device 212 and support the outer shell 218 relative to the inner shell 214. In some examples, the plurality of bearing 220 may limit binding or jamming of the shells or bearings during operation.

In some embodiments, an input torque 224, for example to the outer shell 218, produces an output torque 226 at another shell, such as the inner shell 214, that is different from the input torque 224. In some examples, the input torque 224 may be greater than the output torque 226. In some examples, the input torque 224 may be less than the output torque 226. In some examples, the input torque 224 may be in the same direction as the output torque 226. In some examples, the input torque 224 may be in a different direction as the output torque 226.

Figures 1, 3:
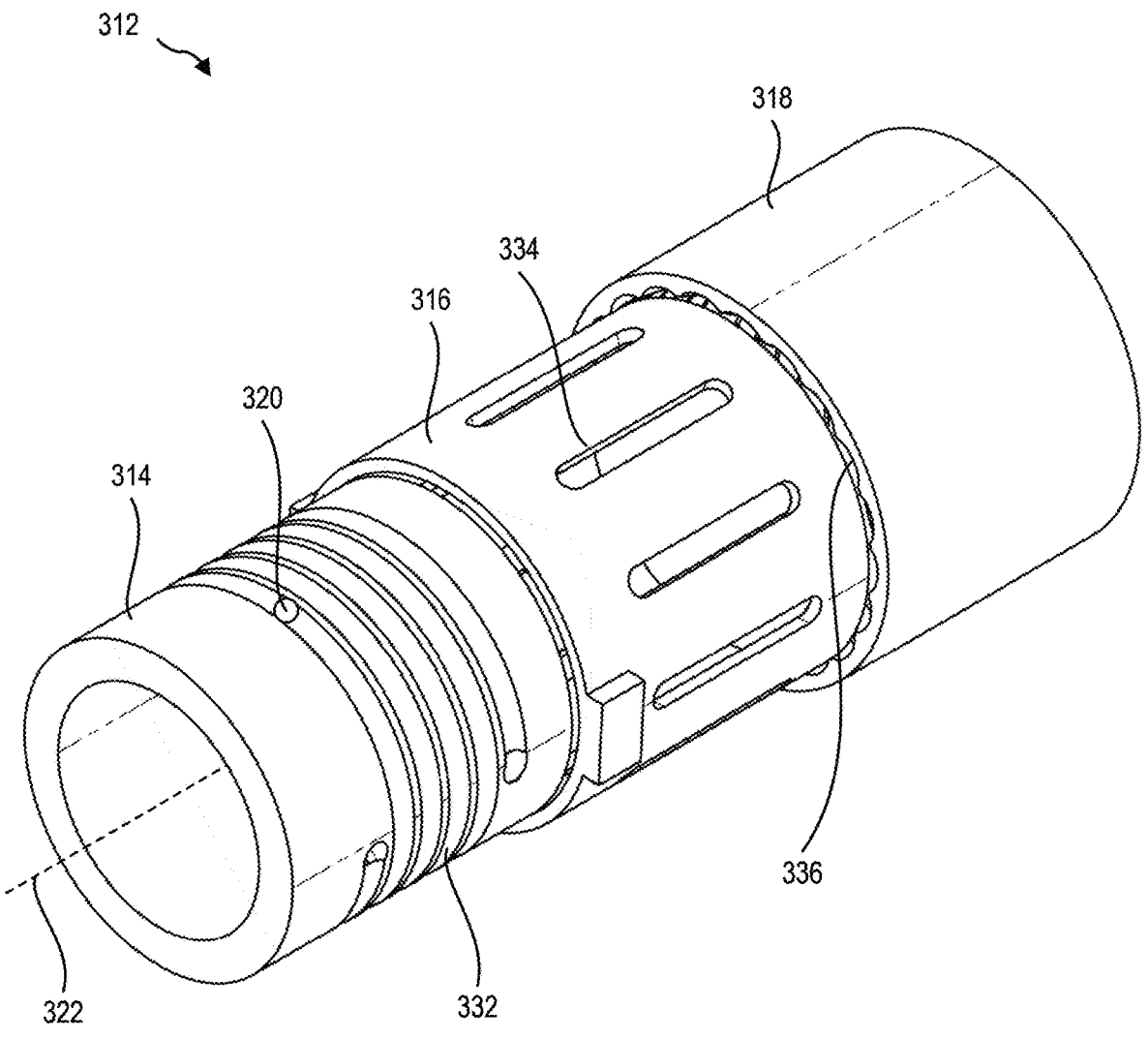
Figures 2, 3:
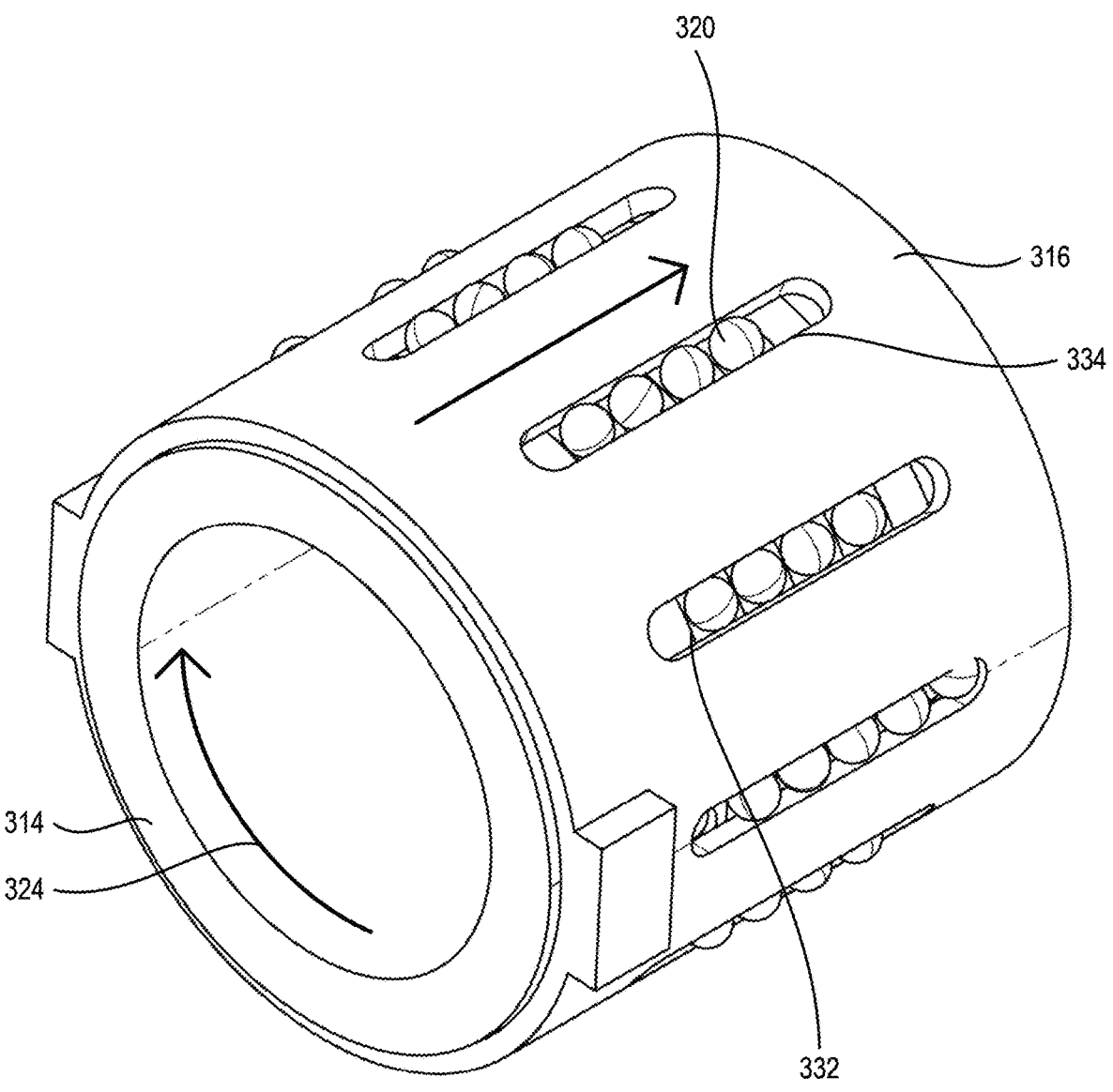
Figure 3:
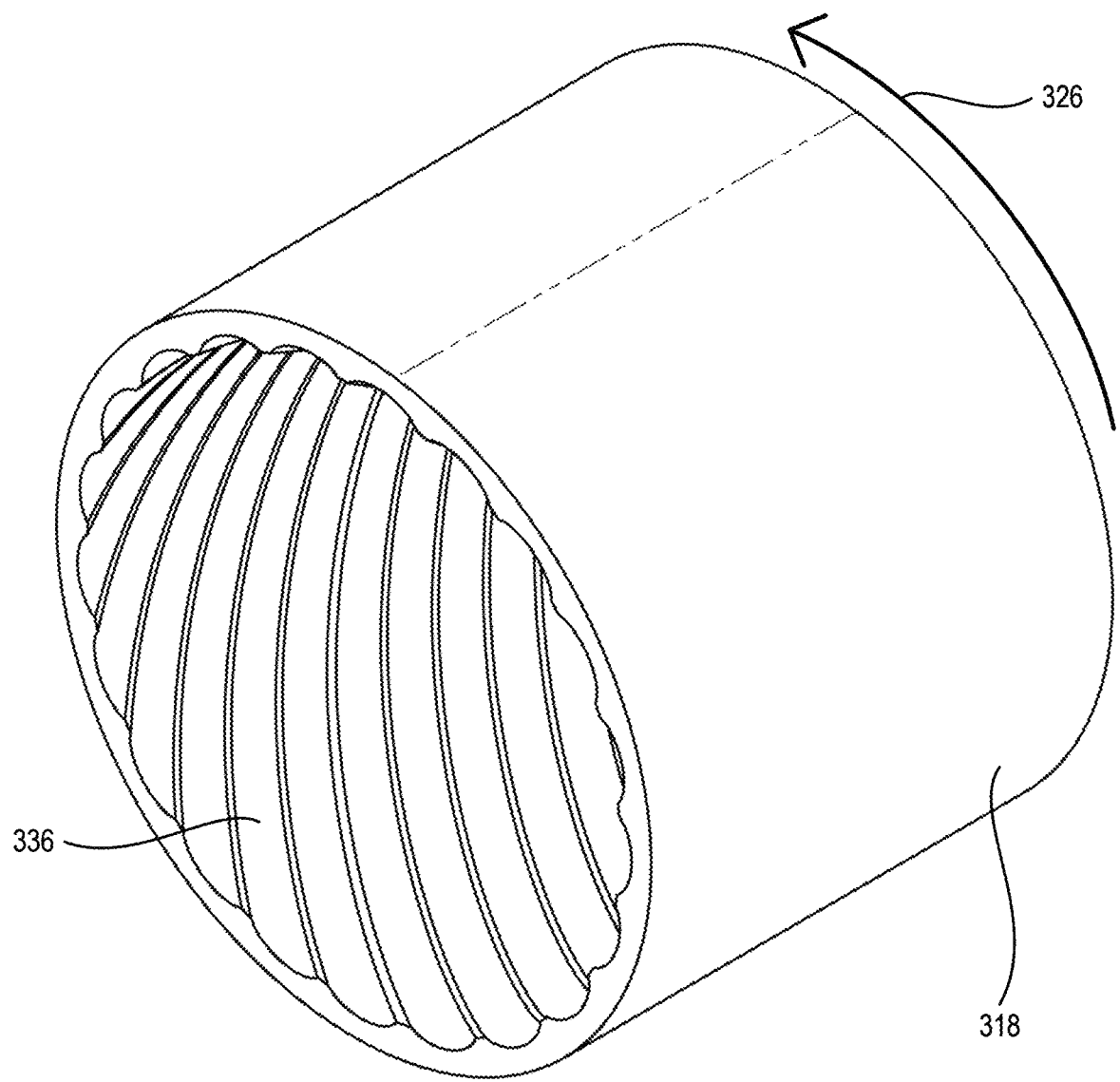

FIG. 3-1 is an axially exploded view of an embodiment of a concentric torque transmission device 312. The bearing 320 is illustrated located proximate to the inner shell 314 but should be understood to be between the inner shell 314 and the outer shell 318 when assembled. In some embodiments, the bearing 320 contacts an inner groove 332 in an outer surface of the inner shell 314 and an outer groove 336 in an inner surface of the outer shell 318. In some embodiments, the bearing 320 is also captured in a slot 334 of the intermediate shell 316. The inner groove 332 and the outer groove 336 are each angled relative to the longitudinal direction of the rotational axis 322 and the rotational direction around the rotational axis 322. The inner groove 332 and the outer groove 336, therefore, each have a component in the longitudinal direction and the rotational direction.

FIG. 3-2 is a detail view of the inner shell 314 and the intermediate shell 316 of the concentric torque transmission device 312 of FIG. 3-1. During operation, the bearing(s) 320 is able to move longitudinally in the slot 334 relative to the intermediate shell 316. For example, an input torque 324 or other rotation of the inner shell 314 around the rotational axis 322 relative to the intermediate shell 316 urges the bearings 320 longitudinally in the slot(s) 334. More particularly, the rotation of the inner shell 314 around the rotational axis 322 causes the angled inner groove 332 of FIG. 3-1 to interact with the bearing 320 and move the bearing 320 longitudinally through the inner groove 332 while the slot 334 limits and/or prevents rotational movement of the bearing 320. In some embodiments, rotating the inner shell 314 relative to the intermediate shell 316 in the opposite direction causes the bearing to move longitudinally in the slot 334 in the opposite longitudinal direction. While the slot(s) 334 are illustrated in FIG. 3-1 through FIG. 3-3 as oriented parallel to the rotational axis 322, it should be understood that the slot(s) 334 may have other orientations. For example, the slot 334 may be angled (e.g., helixed around the rotational axis) in the rotational direction of the inner groove. In some examples, the slot 334 may be angled in the rotational direction of the outer groove.

FIG. 3-3 is a detail view of the outer shell 318 of the concentric torque transmission device 312 of FIG. 3-1. The outer shell 318 has a plurality of outer grooves 336 in an inner surface thereof. A longitudinal movement of the bearing(s) 320 relative to the outer groove 336 will urge the outer shell 318 to rotate with an output torque 326. While the embodiment of FIG. 3-1 through FIG. 3-3 is described in terms of an input torque 324 applied to the inner shell 314 and an output torque 326 produced at the outer shell 318 with the intermediate shell 316 being stationary, other configurations are possible. For example, rotationally fixing the outer shell 318 and rotating the intermediate shell 316 with an input torque 324 may produce an output torque 326 at the inner shell 314. In another example, rotationally fixing the inner shell 314 and rotating the outer shell 318 with an input torque 324 may produce an output torque 326 at the intermediate shell 316.

In some embodiments, the concentric torque transmission device 312 may operate by oscillating input torque direction and therefore oscillating the bearing 320 longitudinally in the slot 334. However, in some embodiments, continuous rotational operation in a single rotational direction is desirable. In such examples, a return channel located in the inner shell or outer shell allows the bearings to recirculate through the concentric torque transmission device 312 and move along a length of the inner groove 332 and the outer groove 336 again.

Figure 4:
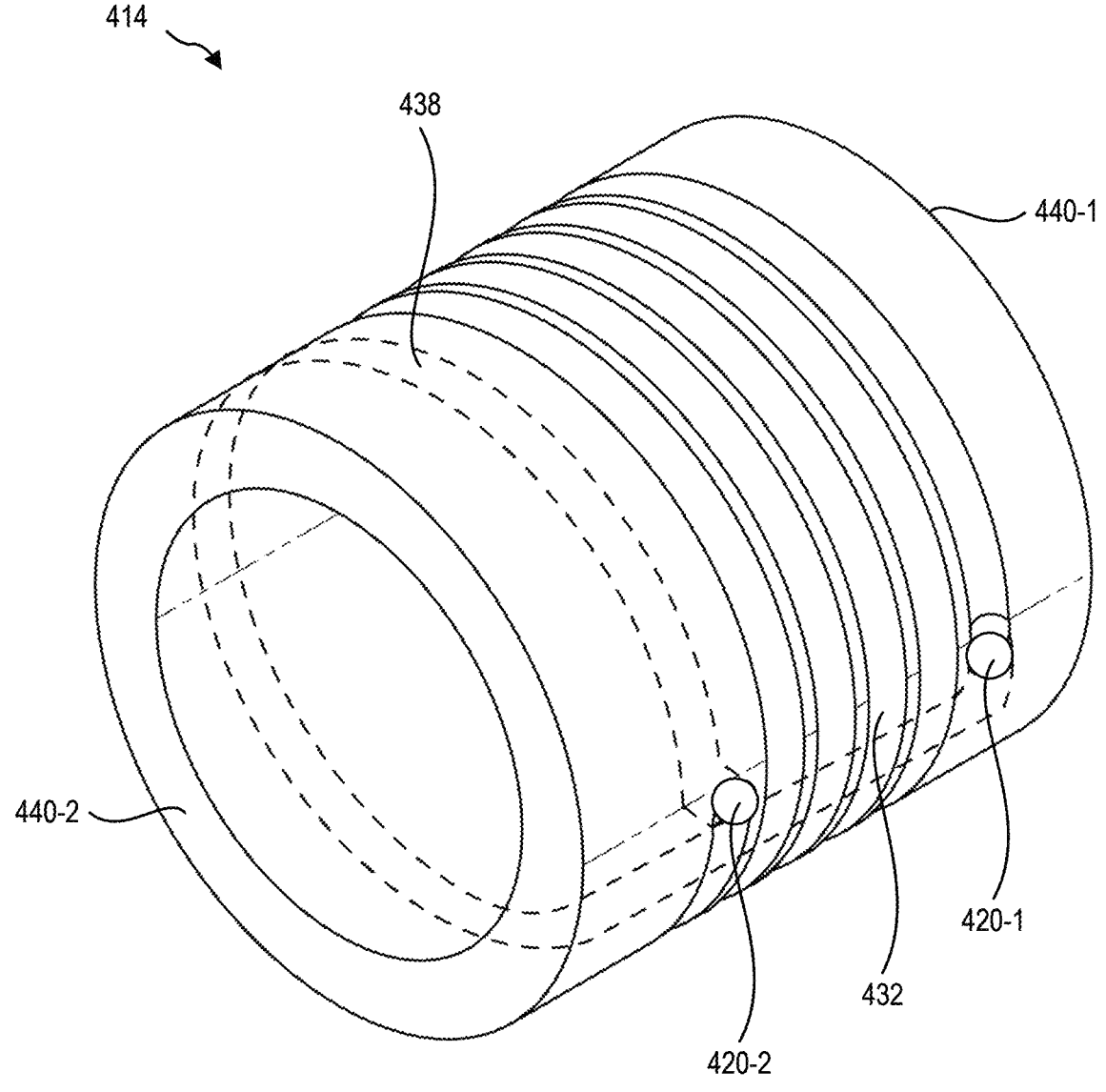
FIG. 4 is a perspective view of an inner shell of a concentric torque transmission device including a return channel, according to at least some embodiments of the present disclosure.

FIG. 4 is a detail view of an embodiment of a return channel 438 in an inner shell 414. It should be understood that the return channel 438 is located in an outer shell, in some embodiments. For example, the presence of a return channel 438 in a shell may place a minimum radial thickness on that shell, limiting design freedom. Depending on the packaging and/or design of the concentric torque transmission device, it may be beneficial to locate the return channel 438 in one or the other shell.

A rotation of the inner shell 414 relative to the bearings 420-1, 420-2 (such as when held rotationally stationary by an intermediate shell) causes the inner groove 432 to move relative to the bearing(s) 420-1, 420-2 and move the bearings 420-1, 420-2 longitudinally, such as described in relation to FIG. 3-1 and FIG. 3-2. Upon reaching a longitudinal end of the inner groove 432, the bearings 420-1, 420-2 are no longer able to move longitudinally. The inner groove 432 terminates at an opening to the return channel 438. The return channel 438 allows the bearings to move in the opposite longitudinal direction to those bearings contacting the inner groove 432. In some embodiments, the return channel 438 recirculates the bearings such that when a first bearing 420-1 is exiting the inner groove 432 and entering the return channel 438, a second bearing 420-2 is exiting the return channel 438 and entering the inner groove 432.

In some embodiments, the return channel 438 has a length that is an integer multiple of a diameter of the bearings. For example, a return channel 438 with a length that is twenty times the diameter of the bearing may hold twenty bearings. In such an example, when the first bearing 420-1 is exiting the inner groove 432 and entering the return channel 438, the series of twenty bearings in the length of the return channel moves together to eject a second bearing 420-2 from the return channel 438 and into contact with the inner groove 432.

In some embodiments, the return channel 438 recirculates bearings to the same inner groove 432. In some embodiments, the inner shell 414 includes a plurality of inner grooves 432 helixed together and the return channel 438 recirculates to a different inner groove. For example, such an inner shell 414 may include a plurality of inner grooves and a plurality of return channels 438 where each return channel recirculates to a different inner groove. In some examples, an inner shell 414 may include a plurality of inner grooves and a plurality of return channels 438 where each return channel recirculates to the opposite longitudinal end of the same inner groove.

Figure 5:
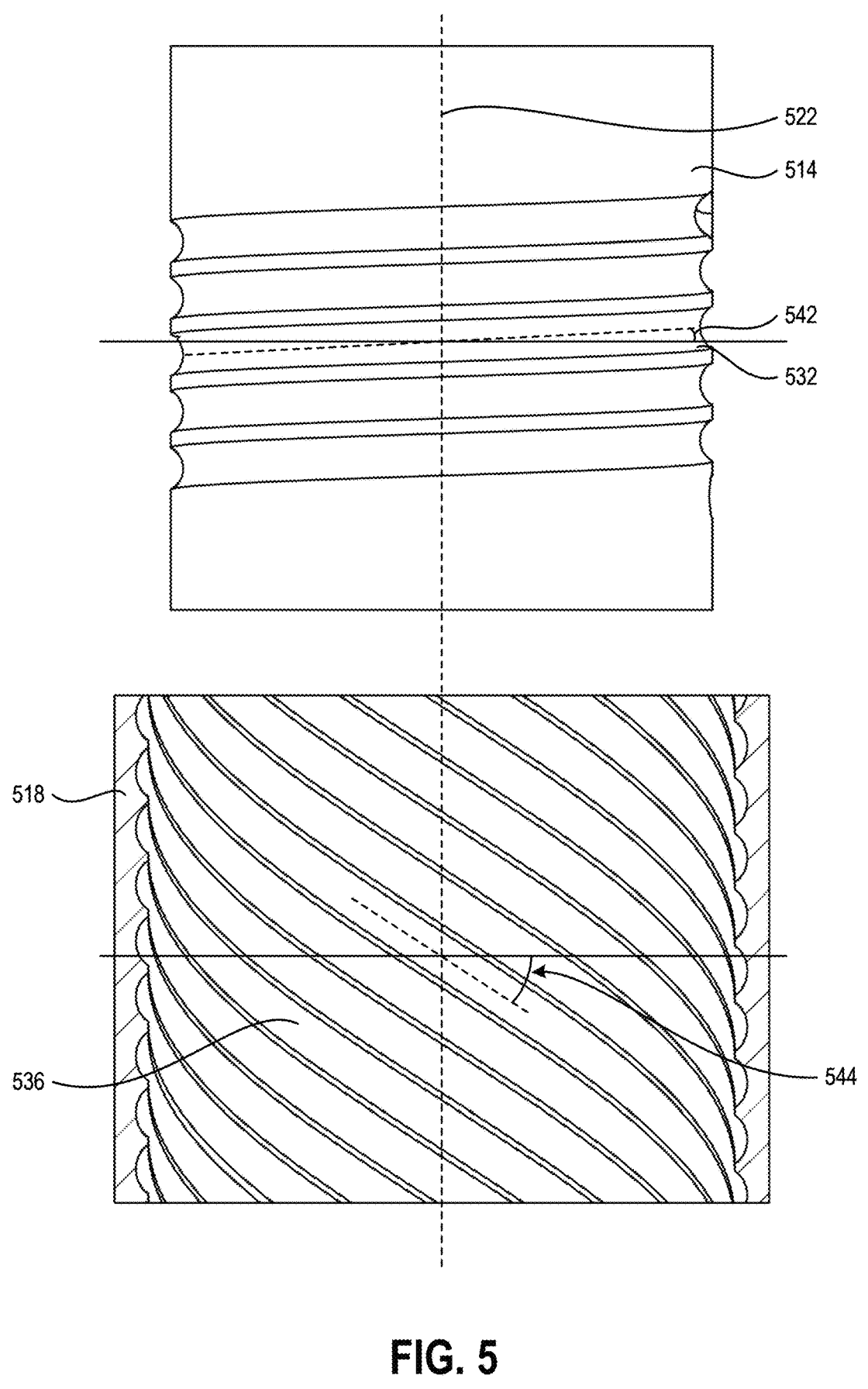

The relative angles of the inner groove and the outer groove of a concentric torque transmission device according to at least some embodiments of the present disclosure determines the gear ratio of the concentric torque transmission device. FIG. 5 is a comparison of an embodiment of groove angles of an inner groove 532 and an outer groove 536 that determine a gear ratio of the concentric torque transmission device. In some embodiments, the inner shell 514 has an inner groove 532 with an inner groove angle 542 relative to a rotational direction (e.g., a circumferential direction) around the rotational axis 522 of the device. In some embodiments, the inner groove angle 542 is clockwise relative to the longitudinal direction of the rotational axis 522. In some embodiments, the inner groove angle 542 is counter-clockwise relative to the longitudinal direction of the rotational axis 522.

In some embodiments, the smaller the inner groove angle 542, the slower the longitudinal translation of a bearing due to rotation of the inner shell 514 relative to the rotational axis 522. In some embodiments, the smaller the inner groove angle 542, the lower the gear ratio when transmitting an input torque from the inner shell 514 to an output torque at the outer shell 518 and/or intermediate shell (i.e., the outer shell 518 and/or intermediate shell rotates more slowly in response). In some embodiments, the larger the inner groove angle 542, the faster the longitudinal translation of a bearing due to rotation of the inner shell 514 relative to the rotational axis 522. In some embodiments, the larger the inner groove angle 542, the higher the gear ratio when transmitting an input torque from the inner shell 514 to an output torque at the outer shell 518 and/or intermediate shell (i.e., the outer shell 518 and/or intermediate shell rotates faster in response).

In some embodiments, the outer shell 518 has an outer groove 536 with an outer groove angle 544 relative to a rotational direction (e.g., a circumferential direction) around the rotational axis 522 of the device. In some embodiments, the outer groove angle 544 is clockwise relative to the longitudinal direction of the rotational axis 522. In some embodiments, the outer groove angle 544 is counter-clockwise relative to the longitudinal direction of the rotational axis 522. In some embodiments, the larger the outer groove angle 544 of the outer groove 536, the slower the rotation of the outer shell 518 relative to the rotational axis 522 due to the longitudinal translation of a bearing. In some embodiments, the larger the outer groove angle 544, the lower the gear ratio when transmitting an input torque from the inner shell 514 to an output torque at the outer shell 518 (i.e., the outer shell 518 and/or intermediate shell rotates more slowly in response). In some embodiments, the smaller the outer groove angle 544, the faster the rotation of the outer shell 518 relative to the rotational axis 522 due to longitudinal translation of a bearing. In some embodiments, the smaller the outer groove angle 544, the higher the gear ratio when transmitting an input torque from the inner shell 514 to an output torque at the outer shell 518 (i.e., the outer shell 518 rotates faster in response).

In some embodiments, the relative direction of the output torque to the input torque is based on the relative orientations of the inner groove(s) 532 and outer groove(s) 536. For example, when the inner groove 532 and the outer groove 536 are oriented in the same rotational direction in the same longitudinal direction, the output torque will be in the same direction as the input torque. In another example, when the inner groove 532 and the outer groove 536 are oriented in the opposite rotational direction in the same longitudinal direction, the output torque will be in the same direction as the input torque. In other embodiments, the output torque may be in the opposite direction as the input torque based on the rotational direction of the input and inner and outer grooves. In some embodiments, the torque conversion ratio and/or torque conversion direction are changeable by changing one of the shells. For example, a single inner shell, intermediate shell, and bearings can be used interchangeably with a set of outer shells enabling a variety of ratios and directions.

FIG. 6 is a flowchart illustrating an embodiment of a method 646 of transmitting torque in a downhole environment. In some embodiments, the method 646 includes receiving an input torque at a first shell of a concentric torque transmission device at 648. In some embodiments, the concentric torque transmission device has three concentric shells, and the first shell is an inner shell of the three concentric shells. In some embodiments, the concentric torque transmission device has three concentric shells, and the first shell is an intermediate shell of the three concentric shells. In some embodiments, the concentric torque transmission device has three concentric shells, and the first shell is an outer shell of the three concentric shells.

The method 646 further includes rotating the first shell around a rotational axis at 650. In some embodiments, the rotational axis is also the rotational axis (i.e., coaxial with) the input torque. The method 646 further includes converting a rotation of the first shell to a longitudinal movement of a bearing in the concentric torque transmission device at 652. In some embodiments, the bearing is rotationally fixed relative to a slot. The rotation of the first shell moves a first groove and the slot relative to one another, where the first groove is angled at a first groove angle relative to a rotational direction around the rotational axis. In some examples, the slot is oriented in an axial direction of the rotational axis. As the first shell having the angled first groove and the axially-oriented slot rotate relative to one another, the first groove urges the bearing in the slot in the longitudinal (i.e., axial) direction.

In some embodiments, the smaller the first groove angle, the slower the longitudinal translation of a bearing due to rotation of the first shell relative to the rotational axis. In some embodiments, the smaller the first groove angle, the lower the gear ratio when transmitting the input torque from the first shell. In some embodiments, the larger the first groove angle, the faster the longitudinal translation of a bearing due to rotation of the first shell relative to the rotational axis. In some embodiments, the larger the first groove angle, the higher the gear ratio when transmitting an input torque from the first shell to an output torque.

In some embodiments, the method 646 includes rotating a second shell around the rotational axis based on the longitudinal movement of the bearing at 654. In some embodiments, the concentric torque transmission device has three concentric shells, and the second shell is either of the shells that is not the first shell. For example, the concentric torque transmission device has three concentric shells, the first shell is an inner shell of the three concentric shells, and the second shell is an outer shell of the three concentric shells. In another example, the concentric torque transmission device has three concentric shells, the first shell is an inner shell of the three concentric shells, and the second shell is an intermediate shell of the three concentric shells. In another example, the concentric torque transmission device has three concentric shells, the first shell is an outer shell of the three concentric shells, and the second shell is an intermediate shell of the three concentric shells. In another example, the concentric torque transmission device has three concentric shells, the first shell is an outer shell of the three concentric shells, and the second shell is an inner shell of the three concentric shells. In another example, the concentric torque transmission device has three concentric shells, the first shell is an intermediate shell of the three concentric shells, and the second shell is an inner shell of the three concentric shells. In another example, the concentric torque transmission device has three concentric shells, the first shell is an intermediate shell of the three concentric shells, and the second shell is an outer shell of the three concentric shells.

The second shell includes a second groove that is angled at a second groove angle relative to a rotational direction around the rotational axis. In some embodiments, the larger the second groove angle, the slower the rotation of the second shell relative to the rotational axis due to the longitudinal translation of a bearing. In some embodiments, the larger the second groove angle, the lower the gear ratio when transmitting an input torque from the first shell to an output torque at the second shell. In some embodiments, the smaller the second groove angle, the faster the rotation of the second shell relative to the rotational axis due to longitudinal translation of a bearing. In some embodiments, the smaller the second groove angle, the higher the gear ratio when transmitting an input torque from the first shell to an output torque at the second shell.

In some embodiments, the relative direction of the output torque to the input torque is based on the relative orientations of the first groove and the second groove. For example, when the first groove and the second groove are oriented in the same rotational direction in the same longitudinal direction, the output torque will be in the same direction as the input torque. In another example, when the first groove and the second groove are oriented in the opposite rotational direction in the same longitudinal direction, the output torque will be in the same direction as the input torque.

The method 646 further includes outputting an output torque based on a rotation of the second shell at 656. In some embodiments, the output torque is greater than the input torque. In some embodiments, the output torque is less than the input torque. In some embodiments, the output torque is in the same rotational direction as the input torque. In some embodiments, the output torque is a different rotational direction than the input torque. In at least one embodiment, the output torque is the same magnitude as the input torque but oriented in an opposite direction.

INDUSTRIAL APPLICABILITY

Embodiments of the present disclosure generally relate to devices, systems, and methods for converting torque in a downhole environment. More particularly, devices, systems, and methods according to the present disclosure may allow a radially thinner torque conversion device compared to a conventional gearbox. In some examples, devices, systems, and methods according to the present disclosure allows for a greater variety of gearing ratios compared to a conventional gearbox.

A concentric torque transmission device, in some embodiments according to the present disclosure, includes a plurality of concentric shells configured to rotate relative to one another. In some embodiments, a bearing is located in a slot through an intermediate shell. The bearing contacts and is captured between an inner groove in a surface of the inner shell and an outer groove in the surface of the outer shell. Application of an input torque to any shell relative to another shell produces an output torque at the remaining third shell. For example, the intermediate shell may be held rotationally fixed while a torque is applied to the inner shell, and an output torque is output at the outer shell. The relative orientation of the inner groove and the outer groove to one another and to the rotational direction of the concentric torque transmission device around a rotational axis determines a gear ratio of the concentric torque transmission device. In some embodiments, the relative orientation of the inner groove and the outer groove allow selection of a direction of the output torque. In some embodiments, the concentric torque transmission device further includes a return channel that recirculates the bearing(s) from a first longitudinal end of the concentric torque transmission device to a second longitudinal end of the concentric torque transmission device, allowing a substantially continuous operation of the concentric torque transmission device.

In some embodiments, the concentric torque transmission device includes three concentrically arranged shells with one or more bearings therebetween and configured to transfer torque between the shells. In some embodiments, the concentric torque transmission device includes an inner shell that is radially closest to the rotational axis of the concentric torque transmission device. In some embodiments, such as any system described herein, the rotational axis of the concentric torque transmission device is coaxial with a rotational axis of the drill string, BHA, drill bit, etc.

The concentric torque transmission device, in some embodiments, includes an intermediate shell positioned circumferentially around and concentrically with the inner shell. The concentric torque transmission device includes an outer shell positioned circumferentially around and concentrically with the intermediate shell and the inner shell. In some embodiments, the concentric torque transmission device includes a bearing located in the intermediate shell and contacting the inner shell and outer shell. The bearing is, in some embodiments, contacting angled grooves in the outer surface of the inner shell and the inner surface of the outer shell such that the bearing is moved by the rotation of either the inner shell and/or the outer shell relative to one another or the intermediate shell. In some embodiments, the concentric torque transmission device includes a plurality of bearings. For example, the plurality of bearings may distribute lateral forces around the concentric torque transmission device and support the outer shell relative to the inner shell. In some examples, the plurality of bearing may limit binding or jamming of the shells or bearings during operation.

In some embodiments, an input torque, for example to the outer shell, produces an output torque at another shell, such as the inner shell, that is different from the input torque. In some examples, the input torque may be greater than the output torque. In some examples, the input torque may be less than the output torque. In some examples, the input torque may be in the same direction as the output torque. In some examples, the input torque may be in a different direction as the output torque. In at least one example, the input torque is the same magnitude as the output torque and in an opposite direction.

In some embodiments, the bearing contacts an inner groove in an outer surface of the inner shell and an outer groove in an inner surface of the outer shell. In some embodiments, the bearing is also captured in a slot of the intermediate shell. The inner groove and the outer groove are each angled relative to the longitudinal direction of the rotational axis and the rotational direction around the rotational axis. The inner groove and the outer groove, therefore, each have a component in the longitudinal direction and the rotational direction.

During operation, the bearing(s) is able to move longitudinally in the slot relative to the intermediate shell. For example, an input torque or other rotation of the inner shell around the rotational axis relative to the intermediate shell urges the bearings longitudinally in the slot(s). More particularly, the rotation of the inner shell around the rotational axis causes the angled inner groove to interact with the bearing and move the bearing longitudinally through the inner groove while the slot limits and/or prevents rotational movement of the bearing. In some embodiments, rotating the inner shell relative to the intermediate shell in the opposite direction causes the bearing to move longitudinally in the slot in the opposite longitudinal direction.

In some embodiments, the outer shell has a plurality of outer grooves in an inner surface thereof. A longitudinal movement of the bearing(s) relative to the outer groove will urge the outer shell to rotate with an output torque. In some examples, the slot may be angled (e.g., helixed around the rotational axis) in the rotational direction of the inner groove. In some examples, the slot may be angled in the rotational direction of the outer groove.

In some embodiments, the concentric torque transmission device may operate by oscillating input torque direction and therefore oscillating the bearing longitudinally in the slot. However, in some embodiments, continuous rotational operation in a single rotational direction is desirable. In such examples, a return channel located in the inner shell or outer shell allows the bearings to recirculate through the concentric torque transmission device and move along a length of the inner groove and the outer groove again.

In some embodiments, a return channel is located in an inner shell. The return channel is located in an outer shell, in some embodiments. For example, the presence of a return channel in a shell may place a minimum radial thickness on that shell, limit design freedom. Depending on the packaging and/or design of the concentric torque transmission device, it may be beneficial to locate the return channel in one or the other shell.

A rotation of the inner shell relative to the bearings (such as when held rotationally stationary by an intermediate shell) causes the inner groove to move relative to the bearing(s) and move the bearings longitudinally. Upon reaching a longitudinal end of the inner groove, the bearings are no longer able to move longitudinally in the slot. The inner groove terminates at an opening to the return channel. The return channel allows the bearings to move in the opposite longitudinal direction to those bearings contacting the inner groove. In some embodiments, the return channel recirculates the bearings such that when a first bearing is exiting the inner groove and entering the return channel, a second bearing is exiting the return channel and entering the inner groove.

In some embodiments, the return channel has a length that is an integer multiple of a diameter of the bearings. For example, a return channel with a length that is twenty times the diameter of the bearing may hold twenty bearings. In such an example, when the first bearing is exiting the inner groove and entering the return channel, the series of twenty bearings in the length of the return channel moves together to eject a second bearing from the return channel and into contact with the inner groove.

In some embodiments, the return channel recirculates bearings to the same inner groove. In some embodiments, the inner shell includes a plurality of inner grooves helixed together and the return channel recirculates to a different inner groove. For example, such an inner shell may include a plurality of inner grooves and a plurality of return channels where each return channel recirculates to a different inner groove. In some examples, an inner shell may include a plurality of inner grooves and a plurality of return channels where each return channel recirculates to the opposite longitudinal end of the same inner groove.

The relative angles of the inner groove and the outer groove of a concentric torque transmission device according to at least some embodiments of the present disclosure determines the gear ratio of the concentric torque transmission device. In some embodiments, the inner shell has an inner groove with an inner groove angle relative to a rotational direction (e.g., a circumferential direction) around the rotational axis of the device.

In some embodiments, the smaller the inner groove angle, the slower the longitudinal translation of a bearing due to rotation of the inner shell relative to the rotational axis. In some embodiments, the smaller the inner groove angle, the lower the gear ratio when transmitting an input torque from the inner shell to an output torque at the outer shell and/or intermediate shell (i.e., the outer shell and/or intermediate shell rotates more slowly in response). In some embodiments, the larger the inner groove angle, the faster the longitudinal translation of a bearing due to rotation of the inner shell relative to the rotational axis. In some embodiments, the larger the inner groove angle, the higher the gear ratio when transmitting an input torque from the inner shell to an output torque at the outer shell and/or intermediate shell (i.e., the outer shell and/or intermediate shell rotates faster in response).

In some embodiments, the larger the outer groove angle of the outer groove, the slower the rotation of the outer shell relative to the rotational axis due to the longitudinal translation of a bearing. In some embodiments, the larger the outer groove angle, the lower the gear ratio when transmitting an input torque from the inner shell to an output torque at the outer shell (i.e., the outer shell and/or intermediate shell rotates more slowly in response). In some embodiments, the smaller the outer groove angle, the faster the rotation of the outer shell relative to the rotational axis due to longitudinal translation of a bearing. In some embodiments, the smaller the outer groove angle, the higher the gear ratio when transmitting an input torque from the inner shell to an output torque at the outer shell (i.e., the outer shell rotates faster in response).

In some embodiments, the relative direction of the output torque to the input torque is based on the relative orientations of the inner groove(s) and outer groove(s). For example, when the inner groove and the outer groove are oriented in the same rotational direction in the same longitudinal direction, the output torque will be in the same direction as the input torque. In another example, when the inner groove and the outer groove are oriented in the opposite rotational direction in the same longitudinal direction, the output torque will be in the same direction as the input torque. In some embodiments, the torque conversion ratio and/or torque conversion direction are changeable by changing one of the shells. For example, a single inner shell, intermediate shell, and bearings can be used interchangeably with a set of outer shells enabling a variety of ratios and directions.

In some embodiments, a method of transmitting torque includes receiving an input torque at a first shell of a concentric torque transmission device. In some embodiments, the concentric torque transmission device has three concentric shells, and the first shell is an inner shell of the three concentric shells. In some embodiments, the concentric torque transmission device has three concentric shells, and the first shell is an intermediate shell of the three concentric shells. In some embodiments, the concentric torque transmission device has three concentric shells, and the first shell is an outer shell of the three concentric shells.

The method further includes rotating the first shell around a rotational axis. In some embodiments, the rotational axis is also the rotational axis (i.e., coaxial with) the input torque. The method further includes converting a rotation of the first shell to a longitudinal movement of a bearing in the concentric torque transmission device. In some embodiments, the bearing is rotationally fixed relative to a slot. The rotation of the first shell moves a first groove and the slot relative to one another, where the first groove is angled at a first groove angle relative to a rotational direction around the rotational axis. In some examples, the slot is oriented in an axial direction of the rotational axis. As the first shell having the angled first groove and the axially-oriented slot rotate relative to one another, the first groove urges the bearing in the slot in the longitudinal (i.e., axial) direction.

In some embodiments, the smaller the first groove angle, the slower the longitudinal translation of a bearing due to rotation of the first shell relative to the rotational axis. In some embodiments, the smaller the first groove angle, the lower the gear ratio when transmitting the input torque from the first shell. In some embodiments, the larger the first groove angle, the faster the longitudinal translation of a bearing due to rotation of the first shell relative to the rotational axis. In some embodiments, the larger the first groove angle, the higher the gear ratio when transmitting an input torque from the first shell to an output torque.

In some embodiments, the method includes rotating a second shell around the rotational axis based on the longitudinal movement of the bearing. In some embodiments, the concentric torque transmission device has three concentric shells, and the second shell is either of the shells that is not the first shell. For example, the concentric torque transmission device has three concentric shells, the first shell is an inner shell of the three concentric shells, and the second shell is an outer shell of the three concentric shells. In another example, the concentric torque transmission device has three concentric shells, the first shell is an inner shell of the three concentric shells, and the second shell is an intermediate shell of the three concentric shells. In another example, the concentric torque transmission device has three concentric shells, the first shell is an outer shell of the three concentric shells, and the second shell is an intermediate shell of the three concentric shells. In another example, the concentric torque transmission device has three concentric shells, the first shell is an outer shell of the three concentric shells, and the second shell is an inner shell of the three concentric shells. In another example, the concentric torque transmission device has three concentric shells, the first shell is an intermediate shell of the three concentric shells, and the second shell is an inner shell of the three concentric shells. In another example, the concentric torque transmission device has three concentric shells, the first shell is an intermediate shell of the three concentric shells, and the second shell is an outer shell of the three concentric shells.

The second shell includes a second groove that is angled at a second groove angle relative to a rotational direction around the rotational axis. In some embodiments, the larger the second groove angle, the slower the rotation of the second shell relative to the rotational axis due to the longitudinal translation of a bearing. In some embodiments, the larger the second groove angle, the lower the gear ratio when transmitting an input torque from the first shell to an output torque at the second shell. In some embodiments, the smaller the second groove angle, the faster the rotation of the second shell relative to the rotational axis due to longitudinal translation of a bearing. In some embodiments, the smaller the second groove angle, the higher the gear ratio when transmitting an input torque from the first shell to an output torque at the second shell.

In some embodiments, the relative direction of the output torque to the input torque is based on the relative orientations of the first groove and the second groove. For example, when the first groove and the second groove are oriented in the same rotational direction in the same longitudinal direction, the output torque will be in the same direction as the input torque. In another example, when the first groove and the second groove are oriented in the opposite rotational direction in the same longitudinal direction, the output torque will be in the same direction as the input torque.

The method further includes outputting an output torque based on a rotation of the second shell. In some embodiments, the output torque is greater than the input torque. In some embodiments, the output torque is less than the input torque. In some embodiments, the output torque is in the same rotational direction as the input torque. In some embodiments, the output torque is a different rotational direction than the input torque. In at least one embodiment, the output torque is the same magnitude as the input torque but oriented in an opposite direction.

The present disclosure relates to systems and methods for converting torque around a rotational axis according to any of the following:

Clause 1. A device for transmitting torque around a rotational axis, the device comprising: an inner shell including an inner groove having an inner groove angle relative to the rotational axis; an intermediate shell circumferentially around the inner shell and having a slot therein, the slot being at least partially oriented in a longitudinal direction of the rotational axis; an outer shell circumferentially around the intermediate shell and including an outer groove having an outer groove angle relative to the rotational axis different from inner groove angle; and a bearing positioned in the slot and contacting the inner groove and the outer groove.

Clause 2. The device of clause 1, further comprising a return channel configured to circulate the bearing from a first longitudinal end of the inner shell to a second longitudinal end of the inner shell.

Clause 3. The device of clause 2, wherein the return channel is located in the inner shell.

Clause 4. The device of clause 2, wherein the return channel is located in the outer shell.

Clause 5. The device of clause 2, wherein the return channel is has a length that is an integer multiple of a bearing diameter of the bearing.

Clause 6. The device of clause 2, wherein the return channel is a first return channel and further comprising a second return channel configured to circulate a second bearing from a first longitudinal end of the inner shell to a second longitudinal end of the inner shell.

Clause 7. The device of clause 6, wherein the first return channel and the second return channel are helixed together around the rotational axis.

Clause 8. The device of clause 1, wherein the inner groove angle and the outer groove angle are oriented in opposite rotational directions around the rotational axis.

Clause 9. The device of clause 1, wherein the inner groove angle and the outer groove angle are oriented in a same rotational direction around the rotational axis.

Clause 10. The device of clause 1, wherein the slot is parallel to the rotational axis.

Clause 11. The device of clause 1, wherein the inner shell is coupled to a torque input.

Clause 12. The device of clause 1, wherein the outer shell is couple to a torque input.

Clause 13. The device of clause 1, wherein the intermediate shell includes a plurality of slots, and further comprising at least one bearing in each slot of the plurality of slots.

Clause 14. A system for providing torque to a drill bit, the system comprising: a torque input element configured to provide an input torque around a rotational axis; a drill bit configured to receive an output torque around the rotational axis; and a torque transmission device including: a first shell including a first groove having a first groove angle relative to the rotational axis, the first shell being rotationally fixed relative to the torque input element and configured to receive the input torque; a second shell circumferentially concentric with the first shell and including an second groove having an second groove angle relative to the rotational axis different from the first groove angle, the second shell being rotationally fixed relative to the drill bit and configured to provide the output torque; an intermediate shell circumferentially between the first shell and the second shell and having a slot therein, the slot being at least partially oriented in a longitudinal direction of the rotational axis; and a bearing positioned in the slot and contacting the first groove and the second groove.

Clause 15. The system of clause 14, wherein the first shell is an inner shell, and the second shell is an outer shell.

Clause 16. The system of clause 14, wherein the first groove angle and the second groove are oriented in different rotational directions around the rotational axis.

Clause 17. A method of transmitting torque in a downhole environment, the method comprising: receiving an input torque at a first shell of a concentric torque transmission device; rotating the first shell around a rotational axis; converting a rotation of the first shell to a longitudinal movement of a bearing in the concentric torque transmission device; urging a second shell to rotate around the rotational axis based on the longitudinal movement of the bearing; and outputting an output torque based on a rotation of the second shell.

Clause 18. The method of clause 17, wherein the input torque is in an opposite direction to the output torque.

Clause 19. The method of clause 17, wherein the input torque is greater than the output torque.

Clause 20. The method of clause 17, further comprising recirculating the bearing in the concentric torque transmission device.

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A system for providing torque to a drill bit, the system comprising:
    a torque input element configured to provide an input torque around a rotational axis;
    a drill bit configured to receive an output torque around the rotational axis; and
    a torque transmission device located between the torque input element and the drill bit, the torque transmission device including:
        a first shell including a first groove having a first groove angle relative to the rotational axis, the first shell being rotationally fixed relative to the torque input element and configured to receive the input torque;

a second shell circumferentially concentric with the first shell and including a second groove having a second groove angle relative to the rotational axis different from the first groove angle, the second shell being rotationally fixed relative to the drill bit and configured to provide the output torque;

an intermediate shell circumferentially between the first shell and the second shell and having a slot therein, the slot being at least partially oriented in a longitudinal direction of the rotational axis; and a bearing positioned in the slot and contacting the first groove and the second groove.

2. The system of claim 1, wherein the first shell is an inner shell, and the second shell is an outer shell.

3. The system of claim 1, wherein the first groove angle and the second groove angle are oriented in different rotational directions around the rotational axis.

4. A method of transmitting torque in a downhole environment, the method comprising:

receiving an input torque from a downhole motor of a bottomhole assembly (BHA) at a first shell of a concentric torque transmission device;

rotating the first shell around a rotational axis;

converting a rotation of the first shell to a longitudinal movement of a bearing in the concentric torque transmission device;

rotating a second shell around the rotational axis based on the longitudinal movement of the bearing; and rotating a drill bit with an output torque based on a rotation of the second shell.

5. The method of claim 4, wherein the input torque is in an opposite direction to the output torque.

6. The method of claim 4, wherein the input torque is greater than the output torque.

7. The method of claim 4, further comprising recirculating the bearing in the concentric torque transmission device.

8. The system of claim 1, wherein the torque transmission device further comprises a return channel configured to circulate the bearing from a first longitudinal end of the slot to a second longitudinal end of the slot.

9. The system of claim 8, wherein the return channel is located in an inner shell of the first shell and the second shell relative to the rotational axis.

10. The system of claim 8, wherein the return channel is located in an outer shell of the first shell and the second shell relative to the rotational axis.

11. The system of claim 8, wherein the return channel has a length that is an integer multiple of a bearing diameter of the bearing.

12. The system of claim 8, wherein the return channel is a first return channel and the torque transmission device further comprises a second return channel configured to circulate a second bearing from a first longitudinal end of the slot to a second longitudinal end of the slot.

13. The system of claim 1, wherein the first groove angle and the second groove angle are oriented in a same rotational direction around the rotational axis.

14. The system of claim 1, wherein the slot is parallel to the rotational axis.

15. The system of claim 1, wherein the intermediate shell includes a plurality of slots, and further comprising at least one bearing in each slot of the plurality of slots.

16. The system claim 1, wherein the torque input element is a drill pipe.

17. The system of claim 1, wherein the output torque of the torque transmission device is co-axial with the input torque.

18. A bottomhole assembly (BHA) comprising:

a downhole motor;

a drill bit having a rotational axis; and a concentric torque transmission device coupled to the drill bit and configured to receive an input torque from the downhole motor, the concentric torque transmission device including:

a first shell including a first groove having a first groove angle relative to the rotational axis, the first shell configured to receive the input torque from the downhole motor;

a second shell circumferentially concentric with the first shell and including a second groove having a second groove angle relative to the rotational axis different from the first groove angle, the second shell being rotationally fixed relative to the drill bit and configured to provide an output torque;

an intermediate shell circumferentially between the first shell and the second shell and having a slot therein, the slot being at least partially oriented in a longitudinal direction of the rotational axis;

a plurality of bearings positioned in the slot and contacting the first groove and the second groove; and a return channel configured to circulate the plurality of bearings from a first longitudinal end of the slot to a second longitudinal end of the slot.

19. The BHA of claim 18, wherein the concentric torque transmission device is configured to change a magnitude of an angular velocity of the input torque across the concentric torque transmission device.

* * * * *